(12) United States Patent
Beall

(10) Patent No.: US 10,129,490 B2
(45) Date of Patent: Nov. 13, 2018

(54) SYSTEMS AND APPROACHES FOR THERMAL IMAGE CORRECTIONS

(71) Applicant: HEMA IMAGING LLC, Minneapolis, MN (US)

(72) Inventor: Erik Beall, Eden Prairie, MN (US)

(73) Assignee: HEMA IMAGING LLC, Eden Prairie, MN (US)

( * ) Notice: Subject to any disclaimer, the term of this patent is extended or adjusted under 35 U.S.C. 154(b) by 0 days.

(21) Appl. No.: 15/091,383

(22) Filed: Apr. 5, 2016

(65) Prior Publication Data

US 2016/0292826 A1  Oct. 6, 2016

Related U.S. Application Data

(60) Provisional application No. 62/143,160, filed on Apr. 5, 2015.

(51) Int. Cl.
*H04N 5/33* (2006.01)
*G06K 7/10* (2006.01)
(Continued)

(52) U.S. Cl.
CPC ......... *H04N 5/332* (2013.01); *G06K 7/10297* (2013.01); *G06K 9/00771* (2013.01);
(Continued)

(58) Field of Classification Search
CPC ........ H04N 5/332; H04N 5/33; G06K 9/2018; G06K 7/10297; G06K 9/00771;
(Continued)

(56) References Cited

U.S. PATENT DOCUMENTS 6,845,913 B2   1/2005 Madding et al.
7,454,050 B2  11/2008 Garvey
(Continued)

FOREIGN PATENT DOCUMENTS

WO   WO-2014127431 A1   8/2014

OTHER PUBLICATIONS

Rangel et al., "3D Thermal Imaging: Fusion of Thermography and Depth Cameras", 12th International Conference on Quantitative Infrared Thermography (2014).
(Continued)

*Primary Examiner* — Joseph Ustaris
*Assistant Examiner* — Jill Sechser
(74) *Attorney, Agent, or Firm* — Marshall, Gerstein & Borun LLP

(57) ABSTRACT

A thermal imaging system includes a thermal imaging sensor configured to capture thermal images of assets in an environment, a non-thermal imaging sensor coupled to the thermal sensor and being configured to capture non-thermal images of the assets, an image alignment system, an image correction system, and a controller configured to control operation of the thermal and non-thermal imaging sensors, the image alignment system, and the image correction system. The controller is configured to determine, using the image correction system, that data representative of a reflective surface is present in a present thermal view of a particular asset, cause the thermal and non-thermal imaging sensors to capture pose-corrected images, generate pose corrected thermal and non-thermal images, with at least one having corrected thermal data corresponding to a location of the reflective surface, and associate the corrected thermal data with the at least one reflective surface.

20 Claims, 11 Drawing Sheets

(51) Int. Cl.

| | | |
|---|---|---|
| *G06K 9/00* | (2006.01) | |
| *G06T 5/00* | (2006.01) | |
| *G06T 7/20* | (2017.01) | |
| *G06T 7/60* | (2017.01) | |
| *G06T 7/00* | (2017.01) | |
| *G06T 3/60* | (2006.01) | |
| *G06T 7/80* | (2017.01) | |
| *G06T 7/33* | (2017.01) | |
| *G06T 7/254* | (2017.01) | |
| *G06K 9/20* | (2006.01) | |

(52) U.S. Cl.
 CPC .............. *G06K 9/2018* (2013.01); *G06T 3/60* (2013.01); *G06T 5/00* (2013.01); *G06T 7/0004* (2013.01); *G06T 7/20* (2013.01); *G06T 7/254* (2017.01); *G06T 7/33* (2017.01); *G06T 7/60* (2013.01); *G06T 7/80* (2017.01); *H04N 5/33* (2013.01); *G06T 2200/24* (2013.01); *G06T 2207/10048* (2013.01); *G06T 2207/30204* (2013.01); *G06T 2207/30208* (2013.01); *G06T 2207/30244* (2013.01)

(58) Field of Classification Search
 CPC .. G06T 7/80; G06T 7/33; G06T 7/254; G06T 3/60; G06T 7/0004; G06T 5/00; G06T 7/20; G06T 7/60; G06T 2200/24; G06T 2207/30208; G06T 2207/30244; G06T 2207/10048; G06T 2207/30204
 See application file for complete search history.

(56) References Cited

U.S. PATENT DOCUMENTS

| | | |
|---|---|---|
| 7,995,830 B2 | 8/2011 | Garvey |
| 8,300,922 B1 | 10/2012 | Garvey, III |
| 8,410,441 B2 | 4/2013 | Stratmann et al. |
| 8,797,409 B1 | 8/2014 | Heinke |
| 9,100,595 B2 | 8/2015 | Schmieder et al. |
| 9,241,151 B2 | 1/2016 | Joo |
| 2004/0201756 A1 | 10/2004 | VanBree |
| 2006/0139475 A1* | 6/2006 | Esch ...................... G03B 37/04 348/340 |
| 2006/0177150 A1* | 8/2006 | Uyttendaele .......... G06T 3/4038 382/284 |
| 2009/0252982 A1* | 10/2009 | O'Keefe ................... F41H 1/02 428/573 |
| 2010/0205553 A1 | 8/2010 | Haigh et al. |
| 2012/0281098 A1* | 11/2012 | Wagner .................. G01N 25/72 348/164 |
| 2013/0050453 A1* | 2/2013 | Bergstrom ........... H04N 5/2258 348/61 |
| 2013/0155248 A1 | 6/2013 | Neeley et al. |
| 2013/0155249 A1 | 6/2013 | Neeley et al. |
| 2014/0160298 A1 | 6/2014 | Johnson |
| 2014/0198955 A1* | 7/2014 | Deigmoeller ......... G06T 7/2013 382/107 |

OTHER PUBLICATIONS

Henry et al., "RGB-D Mapping: Using Depth Cameras for Dense 3D Modeling of Indoor Environments", 12th International Symposium on Experimental Robotics, 18-21 (2010).

* cited by examiner

Concordant optical flow

Discordant optical flow, two primary regions: possible reflections (assume no object in motion)

Build-up map of discordant pixels on surface in 3D space by accumulating discordance errors. Discordance > 40% pixels flagged and region-growing

SYSTEMS AND APPROACHES FOR THERMAL IMAGE CORRECTIONS

CROSS-REFERENCE TO RELATED APPLICATION

This application claims the benefit of U.S. Provisional Application No. 62/143,160, filed on Apr. 5, 2015, the contents of which are herein incorporated by reference in its entirety.

FIELD OF THE DISCLOSURE

The present disclosure generally relates to thermal imaging and, more particularly, to systems and approaches for removing image abnormalities using thermal imaging systems.

BACKGROUND

Thermal imaging is a sensing method for non-contact measurement of temperatures of thermally emissive objects. Thermal imaging devices detect radiation emitted by objects by sensing infrared photons and identifying the flux thereof. By using multiple sensing and focusing elements, the thermal photon flux from separate solid-angular fields of view can be obtained in a similar manner as visible-light cameras. As a result, an image of the temperature of objects being captured is generated.

Thermal imaging may be used to observe operating characteristics of electronic and/or mechanical equipment used in any number of industrial environments such as, for example, manufacturing, fabrication, and/or processing facilities. For example, localization of objects with heat contrast can assist in understanding or discerning the location of a conduit in a wall, a source of a water leak, or identifying faulty and/or overloaded circuit breakers. In these examples, a useful image interpretation may be straightforward such that an untrained or inexperienced user may perform it and discern the issue. In some examples, it is advantageous to enhance the interpretability of the images and perform a thorough analysis of the image and the underlying data in order to obtain a binary decision regarding the functional or structural integrity of an object or the determination of a quantitative figure relating to the functional or structural integrity thereof. As an example, in the field of window retrofitting for the purpose of increasing energy efficiency, an estimate of the insulation quality of a window is useful in order to determine the return on investment of a replacement window with a potentially higher insulation quality.

In other examples, the determination of excessive current carried through a circuit breaker can identify a failed closed circuit breaker by determining the breaker rating through optical character recognition in a visible-light image, integrating the heat associated with the breaker, and using any number of approaches to calculate the estimated current carried through the breaker to obtain a binary measure of the breaker's integrity and/or a probabilistic estimate of the confidence of the measure. Thermal imaging may also be incorporated into a predictive maintenance process used to determine the optimum time when equipment should be serviced and/or replaced. Excess heat given off by equipment is often a key indicator of excess wear or impending equipment failure, thus thermal imaging can serve an integral role in maintaining an efficient and productive work environment.

To perform a thermography scan, i.e., to obtain thermal images of thermally emissive objects, thermographers first identify all relevant unique objects and/or equipment, commonly referred to as "assets," which may demonstrate an abnormal temperature-related issue. Thermal images are taken of each asset using a thermal camera while the thermographer adjusts for contrast and brightness, otherwise known as "level" and "span," to set a mid-image temperature and temperature ranges in the image to optimize information presented therein. Setting appropriate level and span values is of particular importance because these values must appropriately surround meaningful temperature ranges in order to see and record abnormalities in thermal images. As an example, if the desired asset is an electrical panel, there may be a high temperature connection that exists under normal operating conditions. To ignore the high temperature connection, the top of the temperature range must be adjusted and saturated to allow for other subtle temperature variances to be seen. As another example, if an abnormally hot connection is identified, the thermographer may still wish to identify milder abnormally hot conditions. Accordingly, the level and span must be adjusted until any subtler issues become apparent. The thermographer can then record the image to be reviewed and analyzed. Thermographers will typically follow a designated route through the environment to sequentially capture images to allow for repeatability on later dates. Upon obtaining images of all desired assets, the thermographer will review the images and ultimately identify areas of interest and/or concern.

Typically, this process must be repeated, e.g., every 6 months, to monitor areas of interest and/or identify any new areas of interest or concern. However, due to the specialized nature of industrial thermography, thermographers are again needed. Thermographers will thus periodically return to the environment, as needed, to re-perform their analysis. In doing so, they will follow a specified image capture route, created based on the initial thermography scan, that allows them to retrace their steps.

Nonetheless, it will be appreciated that using thermographers to obtain subsequent images to be analyzed can be prohibitively costly and time consuming. As an example, the environment (e.g., the manufacturing facility) may have to be shut down to perform the thermography scan and/or one or more employees may have to work with the thermographer to perform the scan. Moreover, the acquisition of thermal images of the same scene at multiple times is typically associated with differences in the camera location and orientation (or camera "pose"). These differences in acquisition can result in images that do not match on a pixel-by-pixel basis, meaning one pixel does not refer to the same part of the scene or asset within the scene in all images.

Furthermore, in certain environments, assets may have highly reflective surfaces. When using a thermal camera, these reflective surfaces are visible in captured images, and thus may impact image quality and/or cause difficulties in discerning thermal variances in the image. For example, the camera operator's hands, face, and body can be sources of thermal light that are commonly present in reflections. The correct attribution of thermal light to emissive surfaces is complicated when the scene contains reflective surfaces because reflective surfaces are effectively invisible and merely show the thermal photons reflected off of the surface. Thermographers typically ignore the reflections by adjusting their pose and making a mental note to "cancel out" the different patterns of reflections. However, this may result in a poorer quality image since reflections may be present in all perspectives.

BRIEF DESCRIPTION OF THE DRAWINGS

The above needs are at least partially met through provision of the systems and approaches for thermal image corrections described in the following detailed description, particularly when studied in conjunction with the drawings, wherein.

Figure 1:
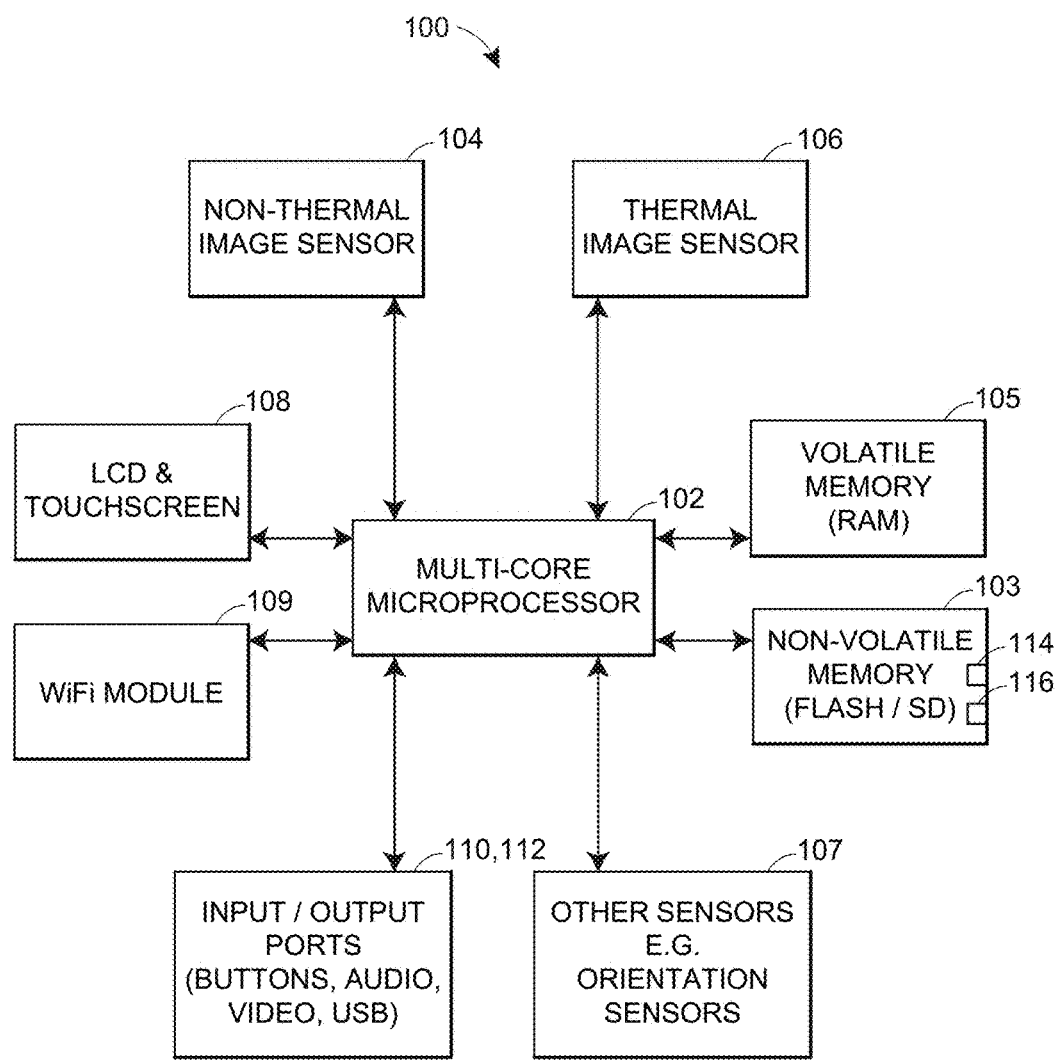
FIG. 1 illustrates a schematic illustration of a thermal imaging device in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, systems and approaches for thermal image corrections are provided. These approaches allow for reflections detected in thermal and non-thermal images to be corrected to allow appropriate thermal data to be provided for locations having reflective surfaces. The purpose of identifying thermally reflective surfaces is to prevent reflected thermal light from being misattributed to a reflective surface. This is oftentimes important for accurate 3-dimensional model estimation and for accurate localization of temperature measurements.

In many embodiments, a thermal or non-thermal imaging sensor is used to view a particular asset in a present or live view. A reflection in the present view is detected using an image correction system. A number of thermal and non-thermal images of the particular asset are then captured at different poses or locations surrounding the asset. Next, an image alignment system determines the homography between the present thermal and/or non-thermal view and each of the captured thermal and/or non-thermal images to determine whether a suitably low error homography transform can be performed. In instances in which low error homography transforms are performed, the images are saved for further analysis. Finally, at relevant pixels of the saved images, a thermal value is obtained that replaces the thermal value or values near the reflective surface.

In some embodiments, the image correction system determines the presence of reflections by identifying an inconsistency between image motion in the captured thermal and non-thermal images using an image motion estimation technique such as, for example, a feature detection, an optical flow detection, and the like. A discordance between the present thermal view and the present non-thermal view may also be used.

The alignment system may determine a homography transform between the present thermal view and the captured thermal images. If suitably low-error homography transforms cannot be performed for a particular image captured at a particular pose, the image is discarded. Otherwise, this process is repeated for all poses, and a set of pose-corrected images are saved. It is understood that in some embodiments, the image alignment system also determines a homography transform between the present non-thermal view and the captured non-thermal images.

The image correction system then determines an appropriate thermal value or values for the portion of the image having a reflective surface. In some examples, a minimum temperature value determined across the saved thermal images can be used. In other examples, an average or any other value may be used.

So configured, a user can determine thermal values for reflective surfaces without the presence of patterns from reflected thermal light, thus eliminating the need for the user to perform additional calculations and/or impart their own knowledge on the effect reflective surfaces may have on thermal data acquisition. Additionally, the system can acquire repeatable thermal images of reflective surfaces where the reflected background may vary from one acquisition to another due to changes in the distribution of thermal sources of reflected light originally emanating from behind the imaging system (such as the camera operator).

Figure 2A:
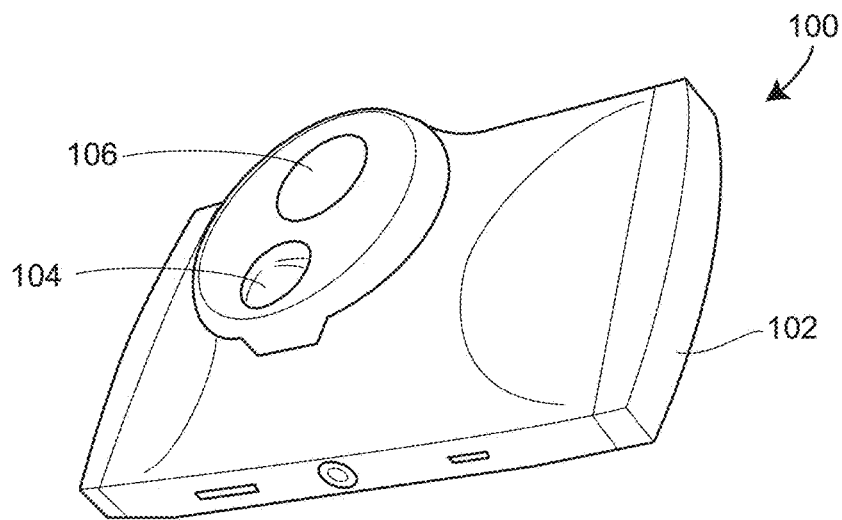
FIGS. 2A and 2B illustrate perspective views of an exemplary thermal imaging device of FIG. 1 in accordance with various embodiments of the invention.
Figure 2B:
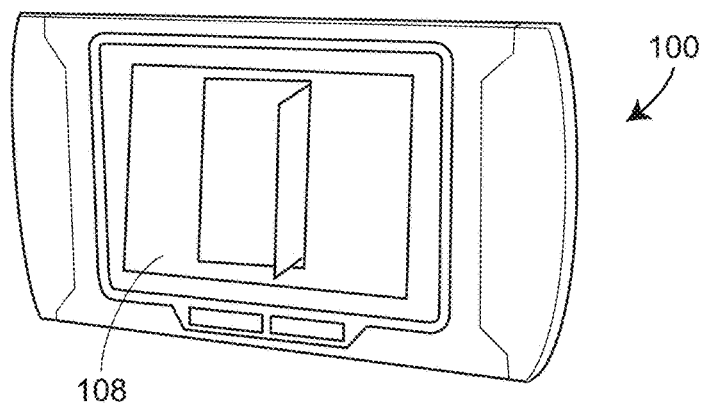

As illustrated in FIG. 1, in many embodiments, a thermal imaging device 100 includes a controller or processor 102, non-volatile memory 103 having an image correction system 114 and an image alignment system 116 stored thereon, a non-thermal image sensor 104, a volatile memory module 105, a thermal image sensor 106, any number of additional sensors 107, a display 108, a communication module 109, any number of inputs 110, and any number of outputs 112. In some forms, the thermal imaging device 100 is contained in a single housing, as illustrated in FIGS. 2A and 2B. In other examples, components of the device 100 are contained in multiple housings. For example, some components such as the thermal image sensor 106 and the controller 102 may be contained in a first housing, and the non-thermal image sensor 104, display 108, and inputs 110 and outputs 112 may be contained in a second housing. In these examples, a separate handheld computing device such as a cellular telephone, tablet, or any other device may be utilized. Components such as the non-thermal image sensor 104, the controller 102, the display 108, and/or the inputs 110 and outputs 112 may be a part of the handheld device, and the thermal image sensor 106 and any other additional components may be adapted to be coupled to and communicate with the handheld device using any number of approaches known in the art. It is further understood that the device 100 may include any number of additional components.

The controller 102 may be any computing device capable of reading and executing any number of computer-readable instructions and execute arbitrary processing operations. The controller 102 may be a processor or processors, and may be in communication with any number of components such as the volatile and non-volatile computer-readable storage modules 103, 105 (e.g., random access memory and flash drives, hard drives, etc.), the wired and/or wireless communication modules 109, inputs and/or outputs 110, 112, and the like. These additional components may be located on a common circuit board or may be located on an electrically- or optically-connected circuit board. The controller 102 is adapted to control operation of the thermal imaging sensor 106, the non-thermal imaging sensor 104, the display 108, the image correction system 114, the image alignment system 116, and any other additional components, as will be described in greater detail below.

The computer-readable instructions may be contained in the non-volatile storage medium 103 or a separate connected non-volatile storage medium and direct the processing circuitry to execute code providing various functionality referred to as the operating system. Operating systems are components of computing devices well-known to those skilled in the art and thus will not be discussed in further detail for the sake of brevity. The operating instructions may be complemented by a standard-based application programming interface (API) that provides an extensible model that may be expanded and reconfigured to perform an arbitrary sequence of application instructions even when the sequence of processing is not presently known. The API provides abstractions of various processing capabilities and functions. The functionality provided by software APIs is well-known to those skilled in the art, and thus will not be discussed in further detail.

The image correction system 114 and the image alignment system 116 may be stored on the non-volatile memory module 103. In other embodiments, the image correction system 114 and the image alignment system 116 may be located remotely from the device 100 (e.g., on a server), and may communicate with the controller 102 via any known communication method using the communication module 109. The image correction system 114 is adapted to identify reflections on assets in the environment. The image alignment system 116 is adapted to align images captured in previous scans with either images currently being captured (or about to be captured) or images captured in scans merely subsequent to the scan performed by the operator of the thermal imaging system to generate images taken from a uniform perspective to ensure the same portions of the asset are captured in each image.

The non-thermal image sensor 104 may be any type of visible, near infrared or other non-thermal wavelength light sensor. In one embodiment, the non-thermal image sensor 104 may be a visible light camera which is sensitive to the visible light spectrum. The non-thermal image sensor 104 is adapted to capture non-thermal light images and/or video of any number of assets in the environment. The thermal image sensor 106 may be any type of imaging sensor adapted to capture thermal images and/or video of any number of assets in the environment. The thermal image sensor 106 may be any type of imaging sensor array which is sensitive to thermal light such as, for example, a microbolometer array, a thermopile array, a thermal diode array, or any other array of sensors which are sensitive to photons and calibrated to produce a non-contact electronic measurement proportional to a temperature of an emissive asset in the thermal image array field of view. The non-thermal image sensor 104 and/or the thermal image sensor 106 may transmit the images and/or video to the controller 102 via a wired or wireless connection.

Non-thermal images and thermal images taken by the non-thermal image sensor 104 and/or the thermal image sensor 106 may be combined in a number of ways in order to enhance the information or interpretability of the individual images. Any of the visible-light images, thermal images, or the combined images can be recorded for later examination, displayed on an output visible-light display system (e.g., the display 108) on the device 100, or transferred to a separate display device (e.g., a separate computing device having a screen).

The display 108 may be any type of output visible-light display system such as, for example, a liquid crystal display (LCD) or other display device such as a TFT display. The display 108 may be coupled with a touchscreen interface for combined display and touchscreen user input.

The inputs 110 and outputs 112 may be any type of component or components which allow the operator to interact with the device 100. In some examples, the inputs 110 may be any number of buttons, switches, toggles, actuators, and the like which are coupled to the device 100. In some forms, the inputs 110 may also be icons or buttons displayed on the display 108. The outputs 112 may be coupled to the display 108 to provide a visual representation of processing, analysis, or any other task executed by the controller 102. Other examples of uses for the inputs 110 and/or outputs 112 are possible.

Sensor Calibration

Figure 3:
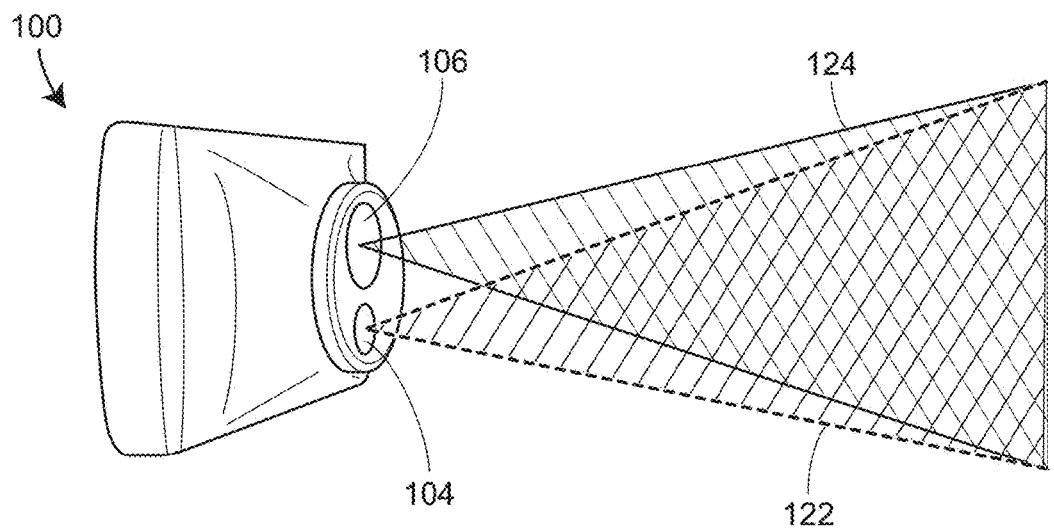
FIG. 3 illustrates a perspective view of the exemplary thermal imaging device of FIGS. 1, 2A and 2B, further illustrating fields of view of a thermal camera and a non-thermal camera in accordance with various embodiments of the invention.

As illustrated in FIG. 3, the non-thermal image sensor 104 generates a first field of view 122 (denoted by forward slashes or "/") and the thermal image sensor 106 generates a second field of view 124 (denoted by backwards slashes or "\"). The non-thermal image sensor 104 and the thermal image sensor 106 are arranged such that the fields of view overlap at area 126. This overlapping field of view 126 represents a combined imaging field of view, and may utilize computer-readable instructions for performing a matched field of view transform and image combination operations when used with the non-thermal image sensor 104 and thermal image sensor 106. A parallax offset and field of view transformation difference between the combined images can be corrected by applying a distance-dependent transform matrix.

Figure 4:
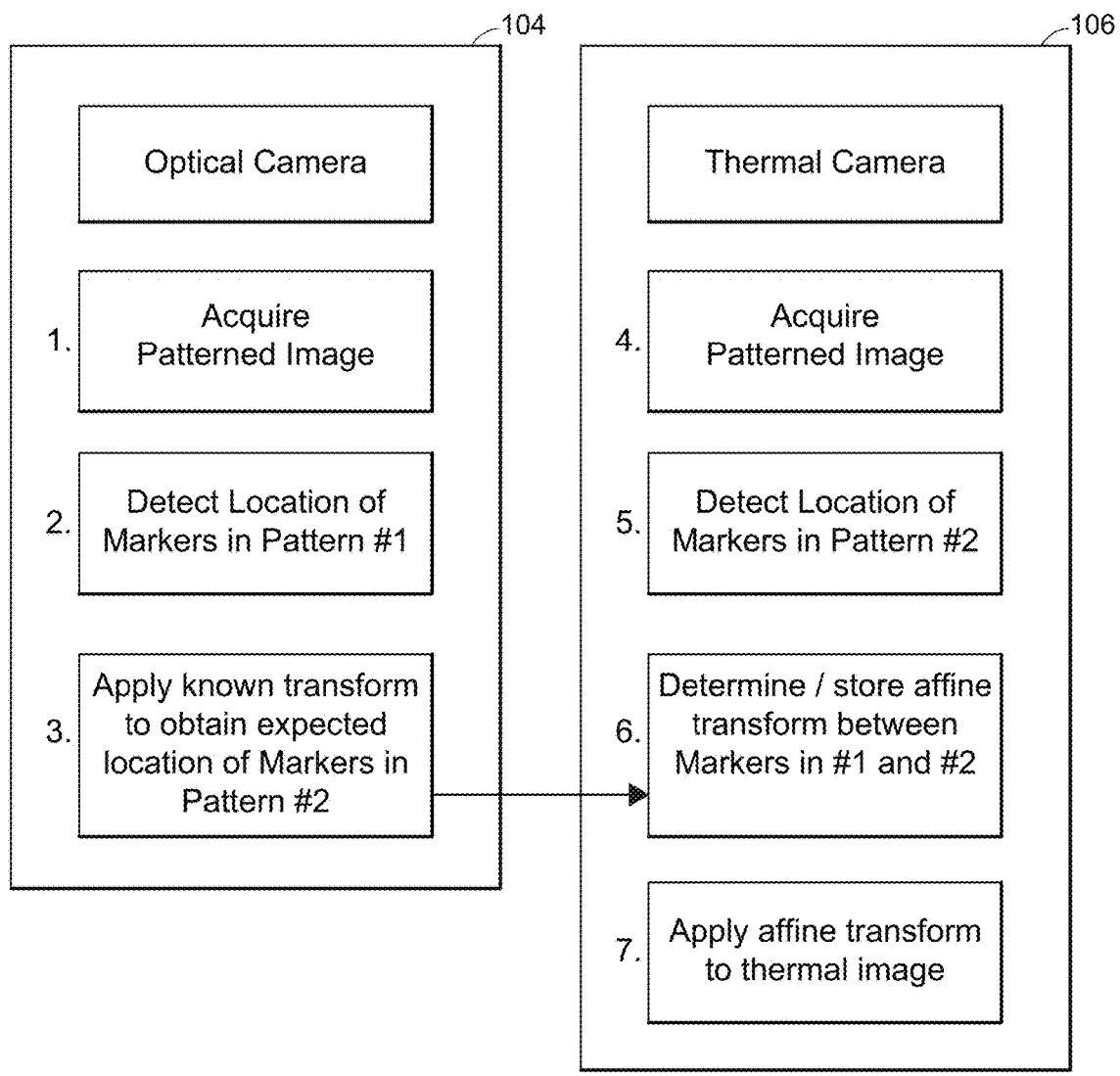
FIG. 4 illustrates an exemplary flowchart for calibrating the non-thermal image sensor and the thermal image sensor of FIGS. 1-3 in accordance with various embodiments of the invention.
Figure 5:
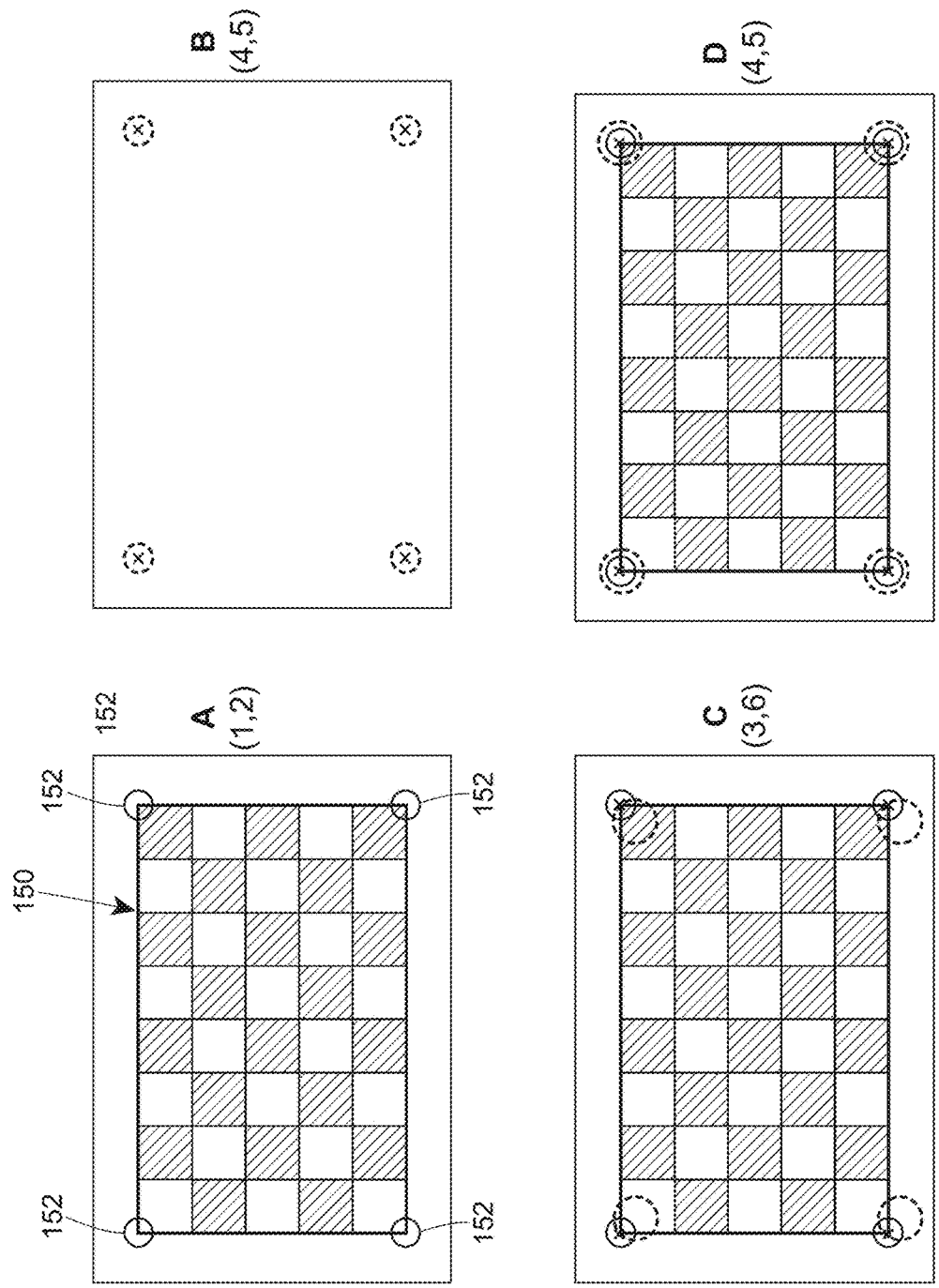
FIG. 5 illustrates an exemplary visualization of the flowchart for calibrating the non-thermal image sensor and the thermal image sensor of FIG. 4 in accordance with various embodiments of the invention.

Turning to FIGS. 4 and 5, in some examples, the controller 102 may be adapted to spatially calibrate the non-thermal image sensor 104 and the thermal image sensor 106 despite having different wavelength sensitivities. In FIG. 5, visualization "A" depicts an image obtained from the non-thermal sensor 104, visualization "B" depicts an image obtained from the thermal image sensor 106, and visualizations "C" and "D" depict a combination of the images obtained from the non-thermal image sensor 104 and the thermal image sensor 106. Other approaches for spatially calibrating the fields of view of the non-thermal image sensor 104 and the thermal image sensor 106 are well known to those skilled in the art.

In these examples, the environment can include structured elements consisting of a printed pattern (e.g., a checkerboard pattern 150) visible by the non-thermal image sensor 104. Any number of markers 152 are placed at the corners of the pattern 150. These markers 152 may either be heated or cooled such that their temperature varies from the ambient temperature sufficiently to be resolved from the background by the thermal imaging sensor 106.

With reference still to FIGS. 4 and 5, at step 1 and step 4, the non-thermal imaging sensor 104 and thermal imaging sensor 106 (having overlapping imaging fields of view) are directed at the scene such that the pattern 150 is within the image field of view of the non-thermal imaging sensor 104 (as illustrated in visualization A) and the thermally visible markers 152 are within the image field of view of the thermal imaging sensor 106 (as illustrated in visualization B). The visible structured elements (e.g., the elements viewable by the non-thermal image sensor 104) are resolved within the visible field of view using any number of approaches known in the art such as, for example, computer vision software. At step 2, the visible image is processed to resolve the visible image field of view pixel location of the inner corners of the pattern 150 on the visible image, and at step 5, the thermal pixel location of the four heated or cooled markers 152 is resolved within the thermal image field of view using image thresholding, segmentation, spatial filtering, and/or averaging. Other approaches to resolving the thermal pixel locations are possible.

At step 3, and visualization C, a known transform is applied to the image obtained from the thermal image sensor 106 to obtain an expected location of the thermal markers 152 on the visible image using the controller 102. In other words, the non-thermal image field of view is matched to the thermal image field of view. As shown in visualization C, the estimated location of the thermal markers illustrated in broken lines does not match their location calculated from the visible camera. At step 6, an affine two-dimensional spatial transformation that matches these locations is performed by the controller 102. At step 7 and visualization D, the affine transformation is applied to the thermal image and results in a spatially calibrated thermal image matching the visible image field of view. The matrix describing this affine calibration is then stored for subsequent uses of the device as long as the relative positioning or fixation between the non-thermal image sensor 104 and the thermal image sensor 106 is unchanged during use. Accordingly, the non-thermal image sensor 104 and the thermal image sensor 106 are properly calibrated to allow images from each sensor to be aligned with each other.

It is understood that this process may be repeated for different distances between the sensing body and the imaging plane in order to produce a set of distance-dependent calibration matrices. These distance-dependent calibration matrices can be used to correct images acquired at a range of different distances having differing alignment parallax offsets. In some examples, the operator is directed to select a fixed distance before acquiring images. This distance can be used to select a fixed image transform matrix to be used in all subsequent image acquisition image processing to align the thermal sensor image with the visual sensor image. In most cases, the image transform calibration constants are determined once for a particular spatial arrangement of the thermal image sensor and the non-thermal image sensor.

Image Alignment

In some examples, thermal and non-thermal images of an asset may be aligned in a uniform manner to allow for accurate analysis of changes to the thermal profile of the asset over a specified time period. In these examples, an image is taken of the asset or an environment containing the asset and is used as a template for future measurements of that asset. This image or images may be non-thermal, thermal, both thermal and non-thermal, or a combination thereof, and may be captured by a professional thermographer. When a subsequent measurement of the particular asset of interest is desired, the image alignment system 116, controlled by the controller 102, causes the template scene image to be shown on the display 108 linked to the imaging device 100.

The operator may then prepare to acquire images of the environment using approximately the same imaging orientation and distance from the asset as well as the same overall field of view of the environment, such that the environment matches the template environment as closely as possible. While acquiring the matching image, the original template environment image may be shown on the display 108 as a transparent and/or translucent overlay on the present image, the present image may be processed and displayed as a transparent and/or translucent overlay on the template image, or only the template image or the present image may be shown. In some examples, the template or present image may be further processed prior to display by first applying edge-detection image processing (e.g., Canny edge detection) to the template image and/or the present image, and then overlaying the one processed image onto the other processed template or present image.

Figure 6:
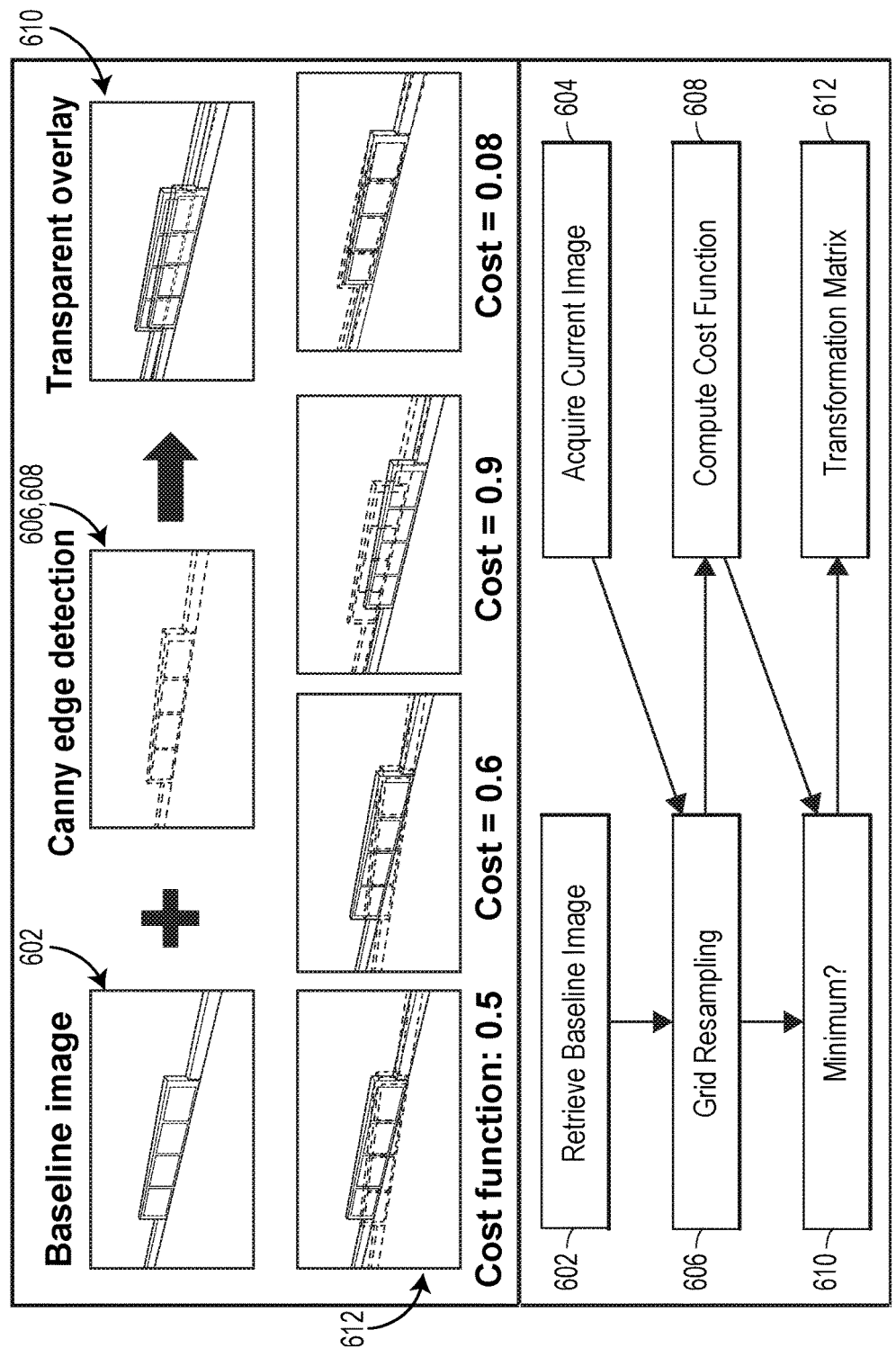
FIG. 6 illustrates an exemplary approach for aligning images taken at different times using an image alignment system in accordance with various embodiments of the invention.

Numerous computational approaches are known for aligning images. Some of these approaches are classified as intensity-based alignment or feature-based alignment. In these approaches, the alignment transformation between the images may be classified as either a linear or a nonlinear transformation. As a non-limiting example using intensity-based image registration to determine a linear transform that aligns images, and as illustrated in FIG. 6, an approach 600 for aligning images taken at different times using an image alignment system is described. There are numerous variations in methods for performing intensity-based alignment of images known to those skilled in the art including various optimization methods for adjusting the transformation such as, for example, markov random fields, New Unconstrained Optimization Algorithm (NEWUOA) or gradient descent, various cost functions for computing difference between transformed images or image histograms such, as but not limited to, least squares, mutual information, correlation ratio, local pearson correlation or normalized correlation, various interpolation methods and various transform restrictions such as, for example, rigid, partial affine with scale plus rigid or full affine.

In this example, baseline and current images (of the current field of view) are acquired at 602, 604. The image alignment system 116 is then applied to the baseline image and/or the present image, and overlays the present image onto the template, baseline, or original image via grid resampling at step 606. At 608, a least squares cost function is computed of the sum of squares of the difference between the original template image and a processed version of the present image being acquired. Image processing applied prior to the computation of the cost function may include spatial transformation, histogram normalization, image segmentation, thresholding, spatial filtering, edge detection, or other such processing known by those in the art. The image difference cost function may be computed using a number of approaches such as, for example, least-squares difference, normalized mutual information, local Pearson correlation and the like. Other examples are possible.

The cost function may be displayed via the display 108 to assist the operator in determining how close or far the present image is from the previous image. In other examples, the cost function may be used after acquiring many images to allow for post-hoc selection of an image or images that most closely match the template scene, or the cost function may be used as a minimization function in an iterative search for a linear image transformation to spatially align the images such that the images match the template more closely.

In one non-limiting example, the template image and the present image are compared after processing by spatially transforming at least one of the images with a linear transformation matrix, by computing the sum of squares of the difference between the processed template and present images as the cost function. The cost function is then used to search for a linear image transform coregistration that minimizes 610 this cost function. By searching for a transform matrix 612 that minimizes the cost function, the transformation that results in the best spatial match between template and present images is determined. Many variations of search strategy are possible, such as, for example, hierarchical gradient descent. Further quality measures such as the residual least squares difference may be used to determine success of the registration procedure. It is understood that the image alignment system 116 may apply image processing to a previously- and/or presently-captured non-thermal and/or thermal image of the particular asset using the non-thermal image sensor 104 and/or the thermal image sensor 106.

Figure 7:
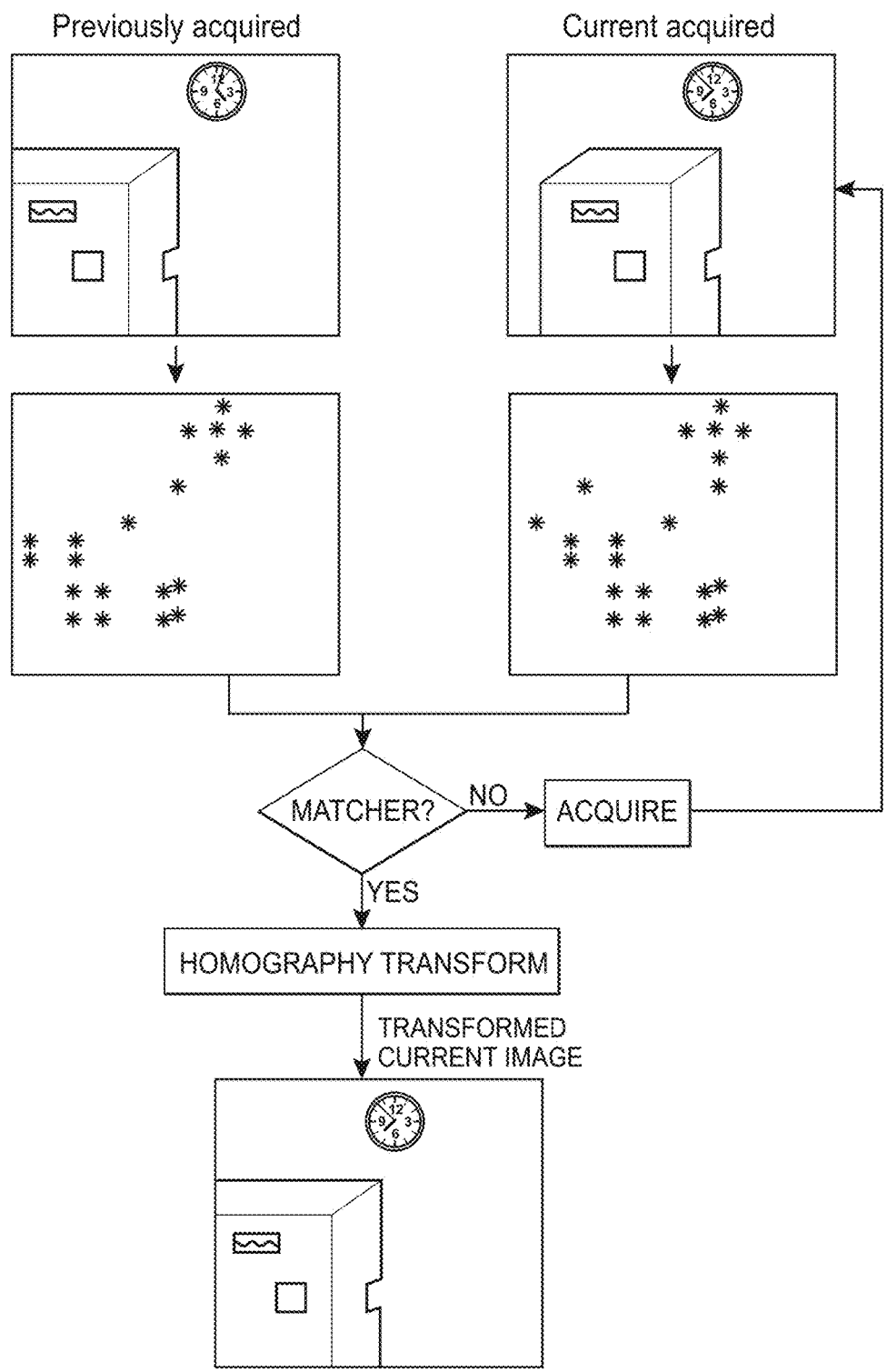
FIG. 7 illustrates an exemplary approach for aligning images taken at different times using a feature-based image alignment system in accordance with various embodiments of the invention.

As a non-limiting example and as illustrated in FIG. 7, image features are used to align the images. In this example, the image alignment system 116 computes and stores any number of image feature vectors describing the environment to be recalled during subsequent scans. The feature descriptors can be computed using any known feature-based description method, such as, for example, descriptors that are less sensitive to camera pose and image intensity. Examples include, but are not limited to, features based on a histogram of oriented gradients, oriented binary robust independent elementary features, binary robust invariant scalable keypoints, fast retina keypoints and others.

The image alignment system 116 may determine feature vectors in the current image and compare these vectors with the stored vectors using approaches known to those skilled in the art such as, for example, random sample, consensus (RANSAC), nearest neighbors, or brute force matching. In the event of a correspondence above a threshold value determined to indicate a match, the matched feature points from the current image and the stored feature points may be passed to a method for determining the perspective transformation between matched points and the perspective transformation applied to the current image. If the perspective transform can be approximated by an affine homography transform, then the perspective transform can be decomposed and used similar to a linear rigid or affine transformation matrix. The resulting perspective-transformed current image may pass through a secondary image co-registration procedure with the stored previously acquired image as the registration target and the resulting image transformations may be combined with the perspective transform and the resulting transform applied to the current non-thermal image data or paired thermal image data. The image alignment system 116 may then allow the previous thermal and/or non-thermal images to be compared with the present thermal and/or non-thermal images to visualize and identify changes between the current scene and the baseline scene using the display 108.

In some examples, the image alignment system 116 may invert the transformation and apply the inverted transform to the previously-acquired images instead of the current image. In some examples, the thermal level and span settings from the baseline or current thermal image are applied to the current or baseline thermal image while spatially matching the visual images, combining the visual to thermal sensor calibration transform with the visual scene transform from the image alignment system 116 and applying the derived transform or its inverse to one of the thermal images and processing both baseline and present images in order to display both at the same time blended or side-by-side. The baseline image may be the first image acquired of an asset, it may be updated periodically with contributions from later images, and/or it may be replaced by a later image, thus, it will be understood that the term "baseline image" can refer to a previously acquired image.

In some examples, the thermal image data obtained from one asset may be compared with thermal image data from a different, identical asset (e.g., two separate electrical panels). In these examples, the appearance of the two assets is sufficiently similar to allow a stable image homography transform or image co-registration, the transform to be applied to the second image, and images to be produced which appear to have been taken from the same perspective relative to the similar asset. The operator may in turn directly compare thermal patterns of the two assets by switching between the two images or performing a subtraction or other pixel-wise image transform to enhance the identification of differences.

In other approaches, the image alignment system 116 includes an inertial monitoring unit (IMU) coupled thereto. The IMU allows the camera orientation with respect to ground to be recorded and can be used to annotate the base image's orientation. This annotation can be used to estimate the orientation component of the pose correction, which is beneficial for later acquisition and computation by constraining the estimated pose to reduce errors and increase speed in computing the full orientation plus translation pose correction.

The IMU orientation with respect to ground can also be used to guide subsequent repeated image scene acquisition by feeding back the difference between the current sensor orientation and the base sensor orientation. It is noted that is not necessary that there be an IMU present for the full pose correction to be performed. During acquisition of subsequent images, the user must maintain a suitable degree of similarity in camera pose to the base camera pose. This similarity may be enforced either using landmarks and knowledge of the scene to be acquired (e.g. an indicator on the floor denoting "stand here for asset A" or simply operator awareness of the scene and functioning of the present system), the base image display or base image transformed in some manner (as previously described), or a displayed estimated pose correction between the current image to the base image can be used to guide the user. A real-time pose correction can be displayed in simplified form (e.g. which direction to move the camera center) in order to guide the camera to match the current scene with the scene in the representative base image. A transform between the current scene image and the base image can be generated through image registration, which may involve a perspective transform for all but small pose differences, or may involve a linear transform particularly if the pose difference is small.

The results of a real-time image transform can be used to help guide the user by assisting in the positioning of the camera, such as by indicating whether distance must be increased or decreased, or by displaying an indication signal proportional in some manner to the cost function of the image transform. Furthermore, the guidance can be simplified and separated into independent degrees of freedom for ease in adjusting only one degree of freedom at a time, because adjusting multiple degrees of freedom at once can be too difficult to perform. The image transform returned by the registration routine can be decomposed into translation, rotation and scaling components. The scaling component relates to the difference in distance between the base and current acquisition, thus a scaling factor greater or less than 1 indicates a difference in distance and a scaling factor of 1 means there is no detectable difference in distance. Accordingly, scaling can be used to guide the user to the correct image acquisition distance.

Figure 8:
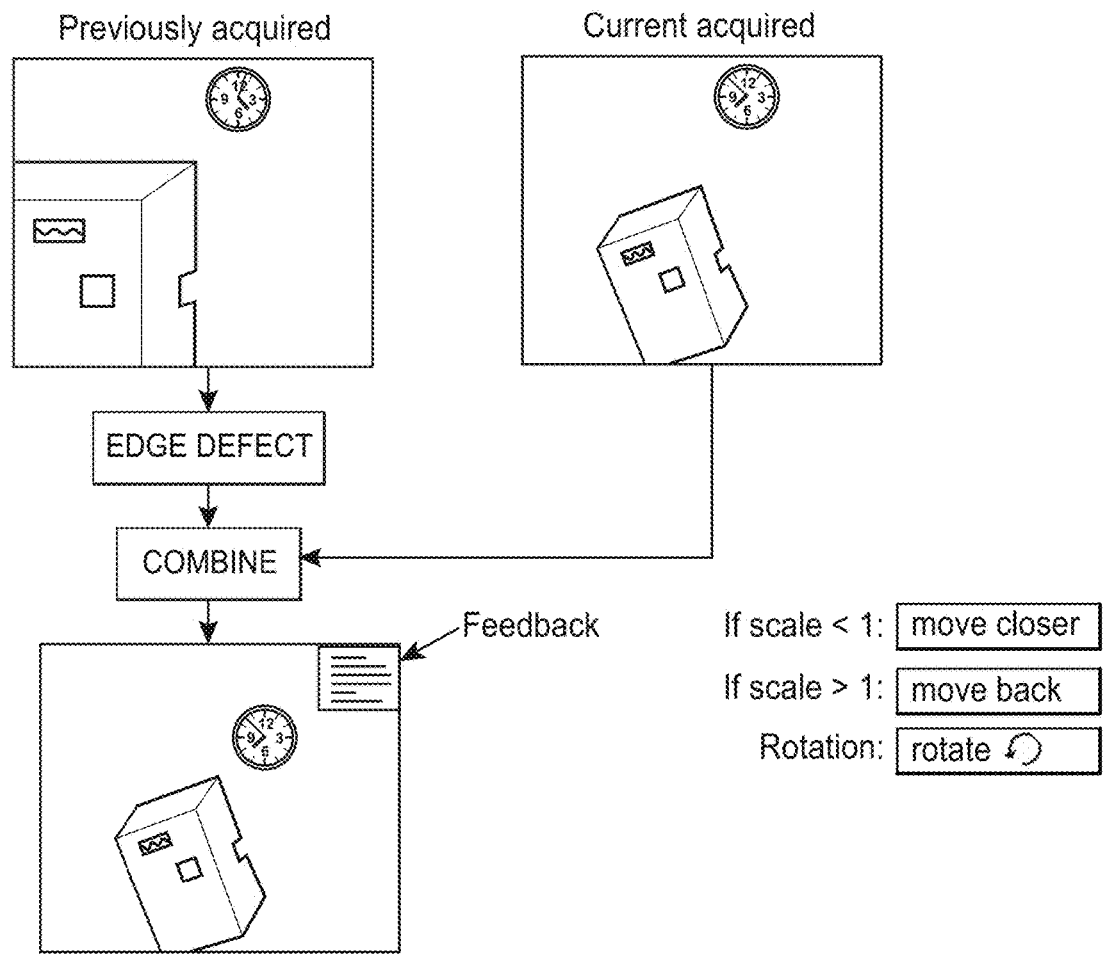
FIG. 8 illustrates an exemplary approach for aligning images taken at different times using a transform-derived feedback system in accordance with various embodiments of the invention.

As illustrated in FIG. 8, from the full pose correction or linear transform, the translation and rotation can be used to direct the operator to adjust the location and orientation of the camera in the plane perpendicular to the imaging axis such that it matches the location and orientation of the camera in the base camera pose. Alternatively, the orientation difference can be ignored if below a suitable threshold and any orientation differences can be handled post-acquisition by a feature-based, intensity-based, or other image alignment process performed by the image alignment system 116. Once the total transform difference from unity is below a pre-defined threshold or error bound, the thermal and visible image or set of suitably below-error images are saved. Following acquisition, a finer-grained (higher accuracy) post-hoc co-registration of the acquired visible image or images to the base visible image is computed, and applied to the visible and thermal images, to more closely match the images to the base image. By synchronizing images on a pixel-by pixel basis, pixel-wise statistical tests may be performed directly on the images.

Figure 9:
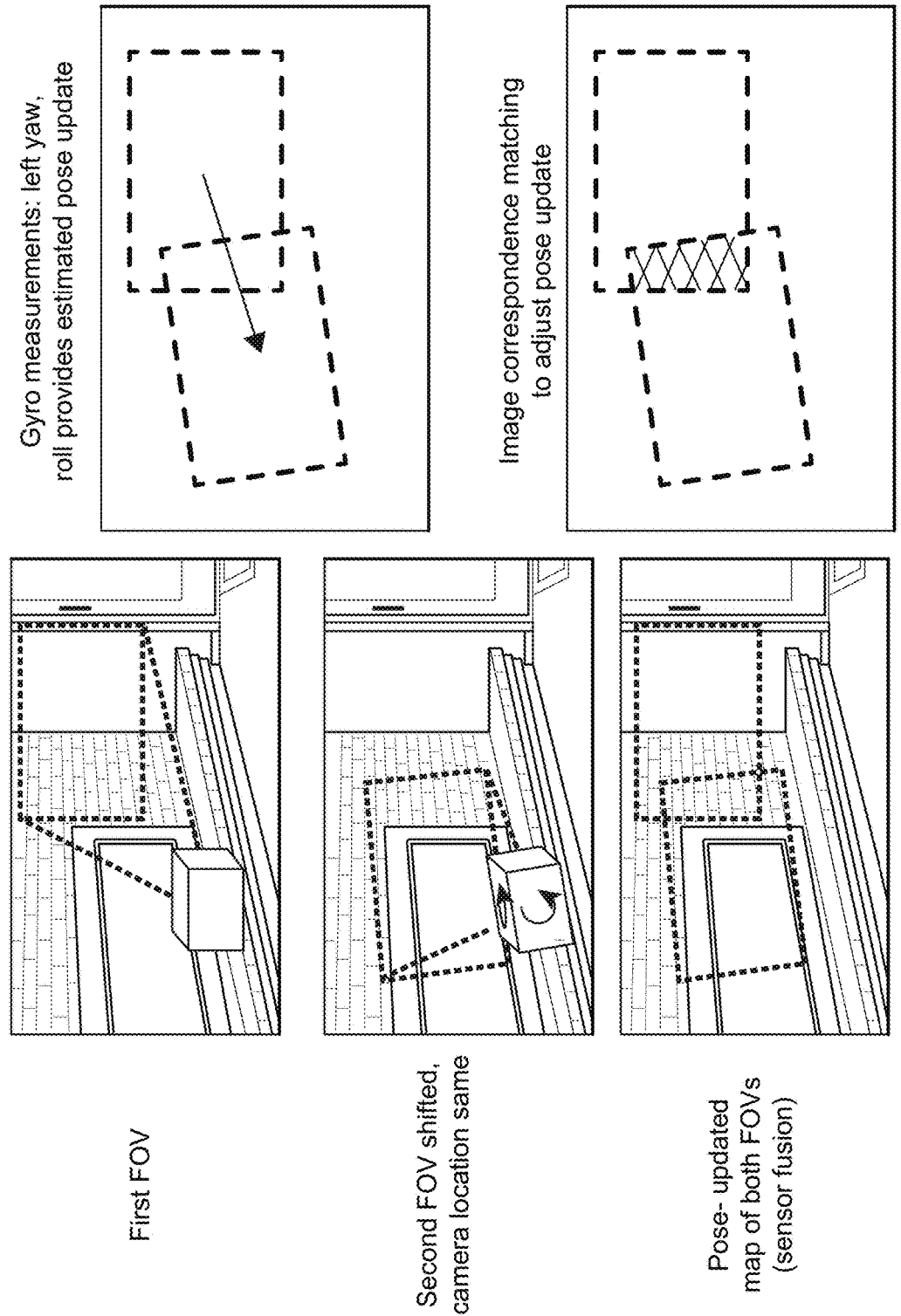
FIG. 9 illustrates an exemplary approach for aligning images using a feature-based image alignment system and an orientation sensor-assisted alignment system in accordance with various embodiments of the invention.

In some examples, and as illustrated in FIG. 9, the device 100 may utilize both feature-based alignment and orientation sensor-assisted alignment. In these examples, the image coregistration is decomposed into an image scale component, a rotation component, and a translation component. The components are used to display indicators on the display 108 which correspond to an intended repositioning and re-orienting of the device 100 so as to match a present pose (or orientation) of the device 100 with a previous pose of the device 100. The orientation system may include sensors such as an accelerometer, an inclinometer, a gyroscope, and/or an inertial monitoring unit, among other components. By measuring the pose of the system when capturing the previous or baseline image of the asset, this information may be used in subsequent scans to initialize an image coregistration search routine, thereby reducing error and time in the computation.

Reflection Correction

In many embodiments, the image correction system 114 corrects thermal reflections in a scene acquired of an asset with the non-thermal image sensor 104 and the thermal image sensor 106 by first either automatically identifying thermal reflections or by a user manually indicating that a thermal reflection is expected to be present. A correction procedure to remove the effect of the thermal reflections includes acquiring or guiding the user to acquire a sequence of thermal and/or non-thermal images of the particular asset with different poses and using the image alignment system 116 and any number of pose correction techniques to produce a sequence of thermal images that appear to have been acquired with the same pose. This same pose is either a representative pose from one of the captured images or the most representative average (or median) pose of images acquired.

Upon acquiring these pose-corrected images, a sequence of thermal images are assembled for pixel-based correction. In one example, a statistical fit to the pixel temperatures (such as, for example, the average measured pixel temperature across pose-corrected acquired images) is used as the reflection-corrected pixel level. In other examples, additional information such as information from the discordance in optical flow from the non-thermal and thermal images is used to further limit the involvement of reflections from problematic temperature distributions in order to determine the reflection-corrected pixel levels. The reflection-corrected pixel level or levels can then be associated with the reflected surface.

Figure 10:
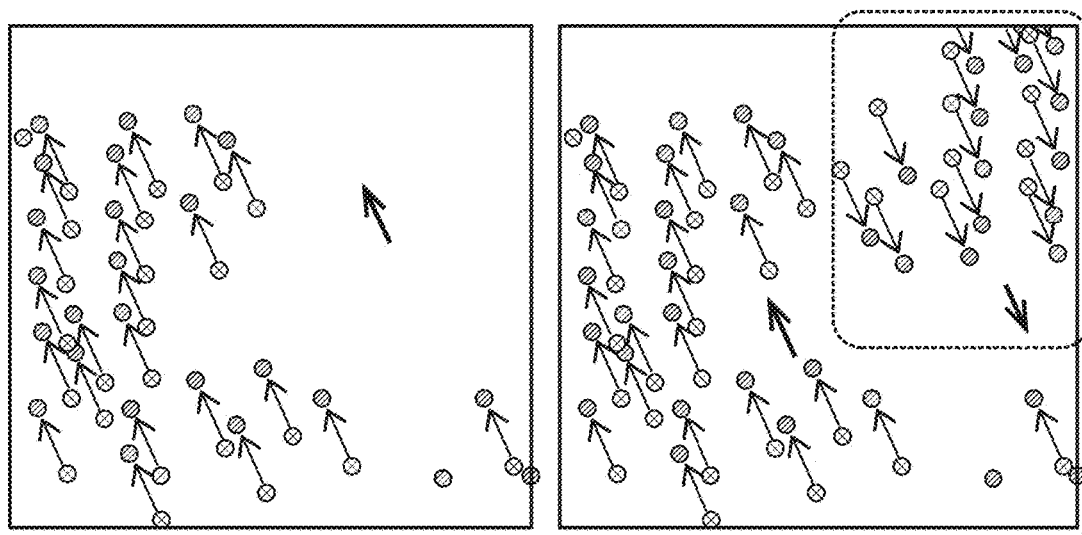
FIG. 10 illustrates an exemplary approach for identifying the presence of reflections in images using an image correction system in accordance with various embodiments of the invention.

As illustrated in FIG. 10, potentially reflecting surfaces can be automatically identified using a number of approaches such as, for example, discordance in optical flow between the average or most representative optical flow within an image and individual regions or pixels of optical flow. Generally speaking, if a surface is reflective in the visible or near infrared range, it is highly likely to be reflective in the thermal far infrared range. Thus, it is first determined, using the image correction system 114, that data representative of a reflected surface is present in a present thermal view of a particular asset. Features in the image or present view are identified and the image alignment system 116 performs a homography detection on the features between images acquired adjacent in time followed by the use of a random sample and consensus method which is well known to those having skill in the art. The features identified and used for tracking give rise to optical flow vectors. In some examples, the optical flow vectors are analyzed for consistency. The most consistent optical flow vectors are removed and the procedure is repeated to find the second most consistent pattern, if any. This is repeated for adjacent optical flow detections and a second-pass consistency search is then performed. In the event that contiguous regions in space are identified with similar discordant optical flow patterns from either the predicted optical flow from previous acquisitions or an IMU or a secondary optical flow pattern, a possible reflector value is incremented. In general, no more than two optical flow patterns will be searched for. In other examples, the optical flow vectors are used to determine an average or most representative vector optical flow as the global optical flow, and the local inconsistency between the local optical flow and the global optical flow is calculated at each location as the optical flow error and an appropriate threshold used to identify potential reflections. The optical flow error statistic can be computed by taking the magnitude of the vector difference of the local optical flow with the global optical flow and dividing by the standard deviation of all optical flow magnitudes or similar measures within the image. Thus, thermally reflective surfaces can be identified by first identifying non-thermally reflective surfaces. In some cases, surfaces that are not reflective in non-thermal wavelengths are thermally reflective and must be identified using other means. Surfaces that are thermally reflective but are not non-thermally reflective can automatically be identified using discordance in optical flow between non-thermal images and thermal images using the same or similar procedures.

In some examples, the automatic detection of thermal reflections can be performed by identifying any number of inconsistencies between image motion in the thermal and non-thermal images using image motion estimation techniques such as feature detection and optical flow, which computes the vector motion of a set of individual pixels within an image. By assuming there are no or minimal non-thermal reflections, the optical flow across the non-thermal image can be taken as a prediction of the optical flow expected to be observed in the thermal image. A total error between expected and measured optical flow is computed and used to indicate the presence of reflections. In some examples, a user may manually input the presence of any number of reflections via inputs 110.

In other examples, discordance between measured optical flow and a predicted optical flow can be used to identify the presence of reflections. This measurement can be performed globally (e.g., the entire present view, image, or environment are assumed to be reflecting and a single image translation and rotation matrix are used) or locally (e.g., regions of the present view, image, environment, and/or particular asset are assumed to be reflecting, thus, a model uses a primary image translation and rotation matrix in addition to a secondary matrix for the particular region.

Figure 11:
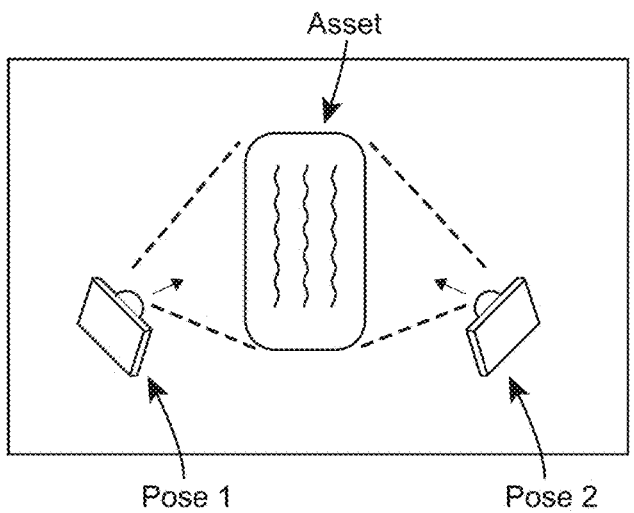
FIG. 11 illustrates an exemplary approach for identifying the presence of reflective surfaces in images using a plurality of poses along a hemispherical path in accordance with various embodiments of the invention.
Figure 11:
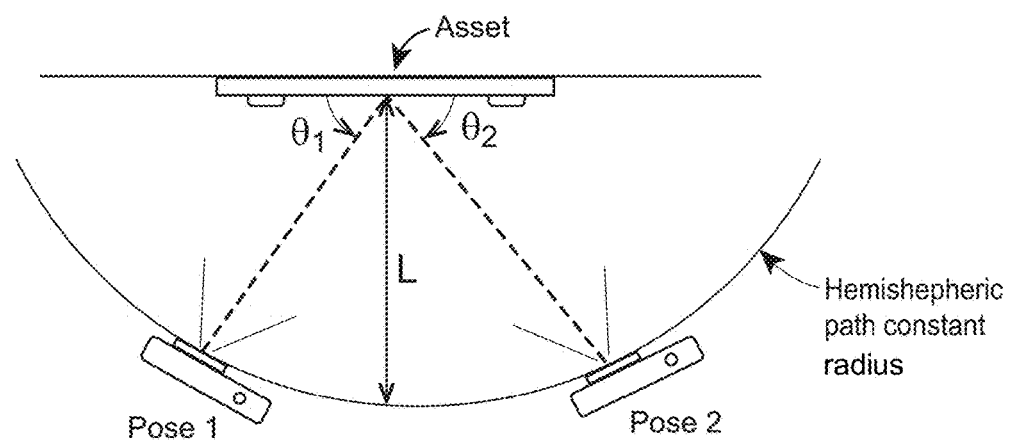
Figure 11:
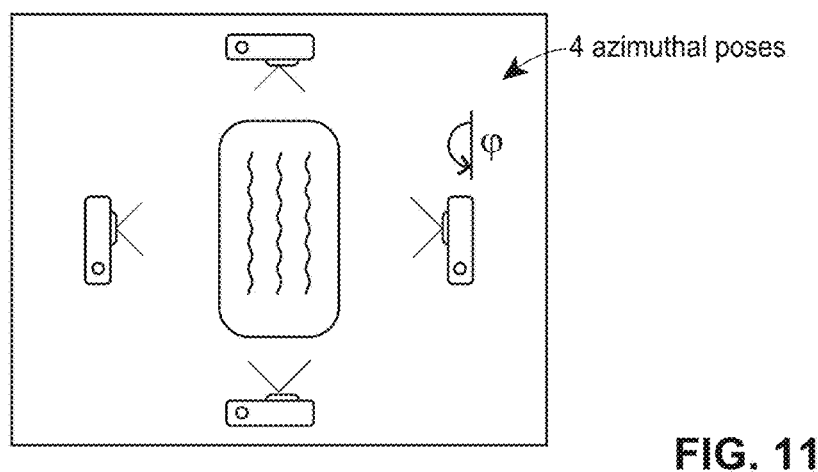

Once the presence of reflections is indicated, whether manually or automatically, a sequence of non-thermal and thermal image acquisitions must be made of the asset where the pose is varied over an adequate space of possible poses by varying the angle of incidence, as measured from the plane of the asset of the image acquisitions while the distance of the image system from the center of the asset within the field of view is held as constant as possible. Typically the pose should be varied from some suitably shallow angle with respect to the asset, to deeper angles near perpendicular, to similar shallow angles but from the opposite side of the original center of the field of view, and to other azimuthal angles about the asset, with a goal of suitable hemispheric imaging coverage. In some situations, there may be a restricted view of the asset which hinders the ability to fully cover an asset, in which case a smaller variety of angled poses with at least some coverage from directions opposite the axes of reflection. For example, as illustrated in FIG. 11, an operator can capture four images of an asset each from a 45 degree angle of incidence. The sequence consists of an image taken from the left of, to the right of, from above and from below the asset, where the left image is opposite the reflective perspective of the right image, and the above image is the opposite of the below image. For each acquisition, the homography between the non-thermal image and the non-thermal image acquired under perpendicular pose or some most representative pose is determined by the image alignment system 116. If a suitably low-error homography transform cannot be performed, the acquisition is discarded, but if a suitably low-error homography transform can be performed, this acquisition is retained and saved.

It should be noted that there is a limit to the acceptable shallowness or to the acceptable range of angles beyond which the perspective correction fails to produce a pose-corrected image that is suitably similar to the baseline or most representative image, resulting in a partially hemispheric path of acquisition. It should also be noted that the desired view may not necessarily be at a 90 degree angle of incidence, or perpendicular to the asset, but some other angle of incidence chosen by the operator, such as 45 degrees from the plane of the asset. In other examples, a similarity measure or other quality metric is computed between each pose-corrected image and the baseline image and a selected threshold is used to discard images that do not result in a suitable pose-corrected image. When the pose-correction metric is too low, feedback can be provided to the user indicating the angle is too far from ideal and the user should adjust closer to baseline or perpendicular or otherwise to a most representative angle.

This process is repeated for all poses, building a set of pose-corrected non-thermal and thermal images for further analysis. During the acquisition process, the optical flow for both thermal and non-thermal images is determined, and the accumulated optical flow error for each pose-corrected thermal image is stored. The storage and use of the optical flow is optional, but as previously described, it can be used to explicitly identify thermal reflections and mask their presence from the sequence of pose-corrected thermal images to produce a sequence of pose-corrected and discordant flow-corrected thermal images.

Finally, at each pixel, the sequence of thermal values varies depending on the pose and background features. In one example, the minimum thermal value can be used, assuming the surrounding space behind and around the device 100 does not contain any significantly colder surfaces than the ambient temperature. Cold assets in the background can cause issues for the automatic detection of a baseline if the cold asset will not be reflected into all pixels from the set of pose acquisitions attempted because there will be some pose-corrected pixels in the scene that have contributions from the cold asset, while other pixels may only have their coldest contribution from the average room surface temperature. There may be some other cold and emissive asset that could introduce low values below the average room temperature, in which case this minimum temperature across poses may not be desired and an alternative statistical characteristic of said distribution used, such as the average. In most cases, the characteristic will be proportional to background or ambient temperature, and a measurement of the background or ambient temperature can be recorded for the purpose of correcting the measured reflection-corrected image to produce a repeatable measurement of reflective surfaces. Notably, images that have been corrected in such a manner can be compared quantitatively, although the sensitivity to changes in asset temperature at each pixel is proportional to the asset emissivity at each pixel. Below some level of emissivity, the sensitivity of this method may be insufficient to detect meaningful changes at some pixels, although the sensitivity may be enhanced in some cases using averaging techniques. This minimum emissivity will depend on numerous factors including the sensitivity of the thermal sensor, the field of view, angular resolution per pixel, distance to target and distribution of asset and background temperature.

In alternative examples, a set of images of the background scenes that are reflected by the asset is acquired, for example, by rotating the device 100 by 180 degrees and acquiring images of the scene that is behind the operator when acquiring images of the asset. The distribution of thermal signatures observed are used to analyze the set of measurements for a given pixel in the pose-corrected asset images such that the distribution of background emitters is matched to the distribution of measurements observed at a given pixel and thereby can be used to calculate a reflectivity coefficient and the reflection-corrected pixel value, repeated at each pixel. In an alternate implementation, the cross-correlation of the set of measurements for a given pixel and adjacent pixels is used to identify common reflection sources. The correlation phase shift is related to the angle of incidence and relative distance to foci of each pixel of interest. The component of maximal cross-correlation with adjacent pixels is used within a limited range of angles of incidence and restricted in area to nearby pixels. The most common shape within a local area is fitted by least-squares or partial correlation across a plurality of adjacent pixels to fit and remove sources of reflection.

The methods described herein for identifying reflections can be used in 3-dimensional mapping from a sequence of images. In these examples, thermal images are generally not needed. Three-dimensional mapping procedures that rely on images and feature-based registration are well known to those having skill in the art. As with other examples described herein, a common problem in image-based 3-dimensional mapping is the presence of reflective surfaces, which can result in image registration solutions that are incompatible with the 3-dimensional model. It is noted that during the 3-dimensional mapping procedure, two incrementors can be allocated for each location within the 3-dimensional model. The first incrementor can refer to the number of image acquisitions with a detected reflection at the location while the other incrementor can refer to the number of unique image acquisitions of the location. If the reflector value is greater than some threshold, such as, for example, 50% of the number of unique image acquisitions of this location, then a binary decision is made that this particular location is considered a reflection.

The predicted optical flow can be obtained from an extended Kalman filter or other temporally updating filter for the pose model or interpolation between previous and subsequent pose, or can be obtained by interpolating the average optical flow measured in previous or subsequent images. When reflection methods are used in 3-dimensional mapping, the 3-dimensional model of the surfaces of the space surrounding the device can include information used to calculate accumulated optical flow error, which is the percent difference in the optical flow versus a primary optical flow, accumulated confidence, which is the number of measurements in agreement in a 3-dimensional location below a given threshold of difference in location, and the reflectance of the surface or surfaces. In one example, the accumulated optical flow error is taken at each surface that has been previously mapped and divided by the number of measurements of the surface. A threshold is then used to identify excessive accumulated error, (such as, for example, a threshold value of 0.5).

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A thermal imaging system, the system comprising
a thermal imaging sensor configured to capture a plurality of thermal images containing thermal data of a plurality of assets in an environment;
a non-thermal imaging sensor coupled to the thermal sensor, the non-thermal imaging sensor configured to capture a plurality of non-thermal images of the plurality of assets;
an image alignment system;
an image correction system; and
a controller configured to control operation of the thermal imaging sensor, the non-thermal imaging sensor, the image alignment system, and the image correction system by:
   (i) determining, using the image correction system, that data representative of a thermally reflective surface is present in a present thermal view of a particular asset by identifying at least one portion of the surface of the particular asset having thermal data corresponding to a location different than the at least one portion of the surface of the particular asset, wherein the at least one portion of the surface of the particular asset having thermal data corresponding to the location different than the at least one portion of the surface of the particular asset corresponds to the thermally reflective surface,
   (ii) causing the thermal imaging sensor to capture a plurality of thermal images and the non-thermal imaging sensor to capture a plurality of non-thermal images of the particular asset at a plurality of poses,
   (iii) generating, using the image alignment system, a plurality of pose-corrected thermal images and a plurality of pose-corrected non-thermal images from the plurality of thermal images and the plurality of non-thermal images, at least one of the pose-corrected thermal images including corrected thermal data corresponding to a location of the reflective surface, and
   (iv) using the image correction system and the plurality of thermal and non-thermal images, associating the corrected thermal data corresponding to the location of the reflective surface with the at least one reflective surface present in the present thermal view.

2. The thermal imaging system of claim 1, wherein the image correction system determines that data representative of a reflected surface is present by identifying an inconsistency between image motion in the captured thermal and non-thermal images using an image motion estimation technique.

3. The thermal imaging system of claim 2, wherein the image motion estimation technique comprises at least one of a feature detection and an optical flow detection that computes vector motion of a set of individual pixels within the captured plurality of thermal images.

4. The thermal imaging system of claim 3, wherein the image alignment system determines a homography between the present thermal view and the captured plurality of thermal images.

5. The thermal imaging system of claim 4, wherein the image correction system determines an optical flow for each of the plurality of pose-corrected thermal images and computes an optical flow error for each of the plurality of pose-corrected thermal images.

6. The thermal imaging system of claim 5, wherein the image correction system uses a minimum thermal value calculated from the optical flow error to remove the thermal data corresponding to at least one reflection from the present thermal view.

7. The thermal imaging system of claim 3, wherein the image alignment system determines a homography between the present non-thermal view and the plurality of pose-corrected non-thermal images, and the image correction system determines an optical flow for each of the plurality of pose-corrected non-thermal images and computes an accumulated optical flow error of the plurality of pose-corrected non-thermal images.

8. The thermal imaging system of claim 1, wherein the image correction system generates a statistic of pose corrected pixels and uses the statistic to replace the data representative of the reflective surface from the present thermal view.

9. The thermal imaging system of claim 1, wherein the plurality of pose-corrected thermal images and the plurality of pose-corrected non-thermal images are captured along a hemispherical path relative to the particular asset.

10. The thermal imaging system of claim 1, wherein the image correction system determines whether the at least one reflection is present by receiving an input from a user.

11. The thermal imaging system of claim 1, wherein the controller is further configured to cause the non-thermal imaging sensor and the thermal imaging sensor to capture a plurality of images in an opposite direction from the particular asset to be used by the image correction system.

12. A method of correcting thermal images in an environment, the method comprising:
    obtaining at least one present thermal view of at least one asset using a thermal imaging sensor and at least one present non-thermal view of the at least one asset using a non-thermal imaging sensor;
    determining, using the image correction system, that data representative of a thermally reflective surface is present in a present thermal view of a particular asset by identifying at least one portion of the surface of the particular asset having thermal data corresponding to a location different than the at least one portion of the surface of the particular asset, wherein the at least one portion of the surface of the particular asset having thermal data corresponding to the location different than the at least one portion of the surface of the particular asset corresponds to the thermally reflective surface;
    capturing a plurality of thermal and non-thermal images of the at least one asset from a plurality of poses;
    generating, using the image alignment system, a plurality of pose-corrected thermal images and a plurality of pose-corrected non-thermal images from the plurality of thermal images and the plurality of non-thermal images, at least one of the pose-corrected thermal images including corrected thermal data corresponding to a location of the reflective surface;
    associating, using the image correction system and the plurality of thermal and non-thermal images, the corrected thermal data corresponding to the location of the reflective surface with the at least one reflective surface present in the present thermal view.

13. The method of claim 12, wherein determining that data representative of a reflective surface is present further comprises determining a discordance between the present thermal view and the present non-thermal view.

14. The method of claim 13, wherein determining the discordance comprises at least one of performing a feature detection and an optical flow detection.

15. The method of claim 14, wherein adjusting the orientation of the plurality of thermal and non-thermal images comprises determining a homography between the present thermal view and the plurality of captured thermal images.

16. The method of claim 15, wherein determining the adjusted temperature value of the at least one reflection comprises determining an optical flow for each of the plurality of thermal images and computing an accumulated optical flow error for each of the plurality of thermal images.

17. The method of claim 12, wherein the image correction system generates a statistic of pose corrected pixels and uses the statistic to replace the data representative of the reflective surface from the present thermal view.

18. The method of claim 12, wherein the plurality of thermal images and the plurality of non-thermal images are captured along a hemispherical path relative to the particular asset.

19. The method of claim 12, wherein identifying the reflection comprises manually notifying the image correction system.

20. The method of claim 12, further comprising capturing a plurality of thermal images and a plurality of non-thermal images in an opposite direction from the particular asset to be used by the image correction system.

* * * * *